United States Patent
Jung et al.

(10) Patent No.: US 10,772,143 B2
(45) Date of Patent: *Sep. 8, 2020

(54) METHOD AND APPARATUS FOR TRANSMITTING INFORMATION FOR D2D OPERATION IN WIRELESS COMMUNICATION SYSTEM

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,205

(22) Filed: Jul. 31, 2019

(65) Prior Publication Data

US 2019/0357285 A1 Nov. 21, 2019

Related U.S. Application Data

(63) Continuation of application No. 16/139,798, filed on Sep. 24, 2018, now Pat. No. 10,405,364, which is a continuation of application No. 15/112,676, filed as application No. PCT/KR2015/001072 on Feb. 2, 2015, now Pat. No. 10,123,359.

(60) Provisional application No. 61/934,835, filed on Feb. 2, 2014.

(51) Int. Cl.
*H04W 76/14* (2018.01)
*H04W 8/00* (2009.01)
*H04W 76/10* (2018.01)

(52) U.S. Cl.
CPC .......... *H04W 76/14* (2018.02); *H04W 8/005* (2013.01); *H04W 76/10* (2018.02)

(58) Field of Classification Search
None
See application file for complete search history.

(56) References Cited

U.S. PATENT DOCUMENTS

2011/0268004 A1   11/2011   Doppler et al.
2013/0244695 A1   9/2013    Park et al.
(Continued)

FOREIGN PATENT DOCUMENTS

CN   102056319   5/2011
CN   102893657   1/2013
(Continued)

OTHER PUBLICATIONS

U.S. Appl. No. 15/112,676, Notice of Allowance dated Jun. 28, 2018, 17 pages.
(Continued)

*Primary Examiner* — Frantz Bataille
(74) *Attorney, Agent, or Firm* — Lee Hong Degerman Kang Waimey

(57) ABSTRACT

A method and apparatus for transmitting information for device-to-device (D2D) operation in a wireless communication system is provided. A user equipment (UE) establishes a radio resource control (RRC) connection with a network. If the UE has interest to perform D2D operation, the UE transmits D2D information to the network. The D2D information may indicate various pieces of information.

16 Claims, 15 Drawing Sheets

(56) References Cited

U.S. PATENT DOCUMENTS

| | | | | |
|---|---|---|---|---|
| 2013/0287012 | A1* | 10/2013 | Pragada | H04W 76/14 370/338 |
| 2013/0288668 | A1 | 10/2013 | Pragada et al. | |
| 2014/0094162 | A1* | 4/2014 | Heo | H04W 72/0486 455/422.1 |
| 2014/0112194 | A1 | 4/2014 | Novlan et al. | |
| 2014/0185529 | A1 | 7/2014 | Lim et al. | |
| 2014/0235248 | A1 | 8/2014 | Chai et al. | |
| 2015/0131540 | A1* | 5/2015 | Koo | H04W 76/14 370/329 |
| 2017/0013648 | A1 | 1/2017 | Jung et al. | |
| 2019/0037623 | A1 | 1/2019 | Jung et al. | |

FOREIGN PATENT DOCUMENTS

| | | |
|---|---|---|
| CN | 103096503 | 5/2013 |
| EP | 2688226 | 1/2014 |
| EP | 3065480 | 9/2016 |
| WO | 2010082114 | 7/2010 |
| WO | 2013032251 | 3/2013 |
| WO | 2013038325 | 3/2013 |
| WO | 2013064126 | 5/2013 |
| WO | 2013113371 A1 | 8/2013 |
| WO | 2013154546 A1 | 10/2013 |
| WO | 2013169974 A1 | 11/2013 |

OTHER PUBLICATIONS

U.S. Appl. No. 15/112,676, Final Office Action dated Sep. 8, 2017, 18 pages.

State Intellectual Property Office of the People's Republic of China Application Serial No. 201580006906.7, Office Action dated Oct. 12, 2018, 8 pages.

European Patent Office Application Serial No. 18206744.7, Search Report dated Dec. 13, 2018, 13 pages.

Huawei, et al., "Considerations on timing and synchronization for D2D", 3GPP TSG RAN WG1 Meeting #74bis, R1-134072, Oct. 2013, 5 pages.

Huawei, et al., "Impact of D2D transmission on the existing cellular system", 3GPP TSG RAN WG1 Meeting #76, R1-140211, Feb. 2014, 6 pages.

QUALCOMM, "D2D Discovery Signal Design", 3GPP TSG RAN WG1 Meeting #75, R1-135323, Nov. 2013, 8 pages.

European Patent Office Application Serial No. 15742644.6, Search Report dated Jun. 13, 2017, 9 pages.

LG Electronics, "RRC states for D2D communication and discovery", 3GPP TSG RAN WG2 Meeting #83, U-132491, Aug. 2013, 3 pages.

Ericsson, "Synchronization Procedures for D2D Discovery and Communication", 3GPP TSG RAN WG1 Meeting #76, R1-140773, Jan. 31, 2014, 7 pages.

\* cited by examiner

METHOD AND APPARATUS FOR TRANSMITTING INFORMATION FOR D2D OPERATION IN WIRELESS COMMUNICATION SYSTEM

CROSS-REFERENCE TO RELATED APPLICATIONS

This application is a continuation of U.S. patent application Ser. No. 16/139,798, filed on Sep. 24, 2018, now U.S. Pat. No. 10,405,364, which is a continuation of U.S. patent application Ser. No. 15/112,676, filed on Jul. 19, 2016, now U.S. Pat. No. 10,123,359, which is the National Stage filing under 35 U.S.C. 371 of International Application No. PCT/KR2015/001072, filed on Feb. 2, 2015, which claims the benefit of U.S. Provisional Application No. 61/934,835, filed on Feb. 2, 2014, the contents of which are all hereby incorporated by reference herein in their entirety.

BACKGROUND OF THE INVENTION

Field of the Invention

The present invention relates to wireless communications, and more particularly, to a method and apparatus for transmitting information for device-to-device (D2D) operation in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

As a part of ProSe, device-to-device (D2D) operation between UEs has been discussed. For efficient D2D operation, a method for transmitting information for D2D operation may be required.

SUMMARY OF THE INVENTION

The present invention provides a method and apparatus for transmitting information for device-to-device (D2D) operation in a wireless communication system. The present invention provides a method for transmitting various pieces of information on D2D operation.

In an aspect, a method for transmitting, by a user equipment (UE), information for device-to-device (D2D) operation in a wireless communication system is provided. The method includes establishing, by the UE, a radio resource control (RRC) connection with a network, and transmitting, by the UE, D2D information indicating that the UE has interest to perform the D2D operation to the network.

In another aspect, a user equipment (UE) configured to transmit information for device-to-device (D2D) operation in a wireless communication system is provided. The UE includes a radio frequency (RF) unit configured to transmit or receive a radio signal, and a processor coupled to the RF unit, and configured to establish a radio resource control (RRC) connection with a network, and transmit D2D information indicating that the UE has interest to perform the D2D operation to the network.

A network can know UE's interest of D2D operation.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC- FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
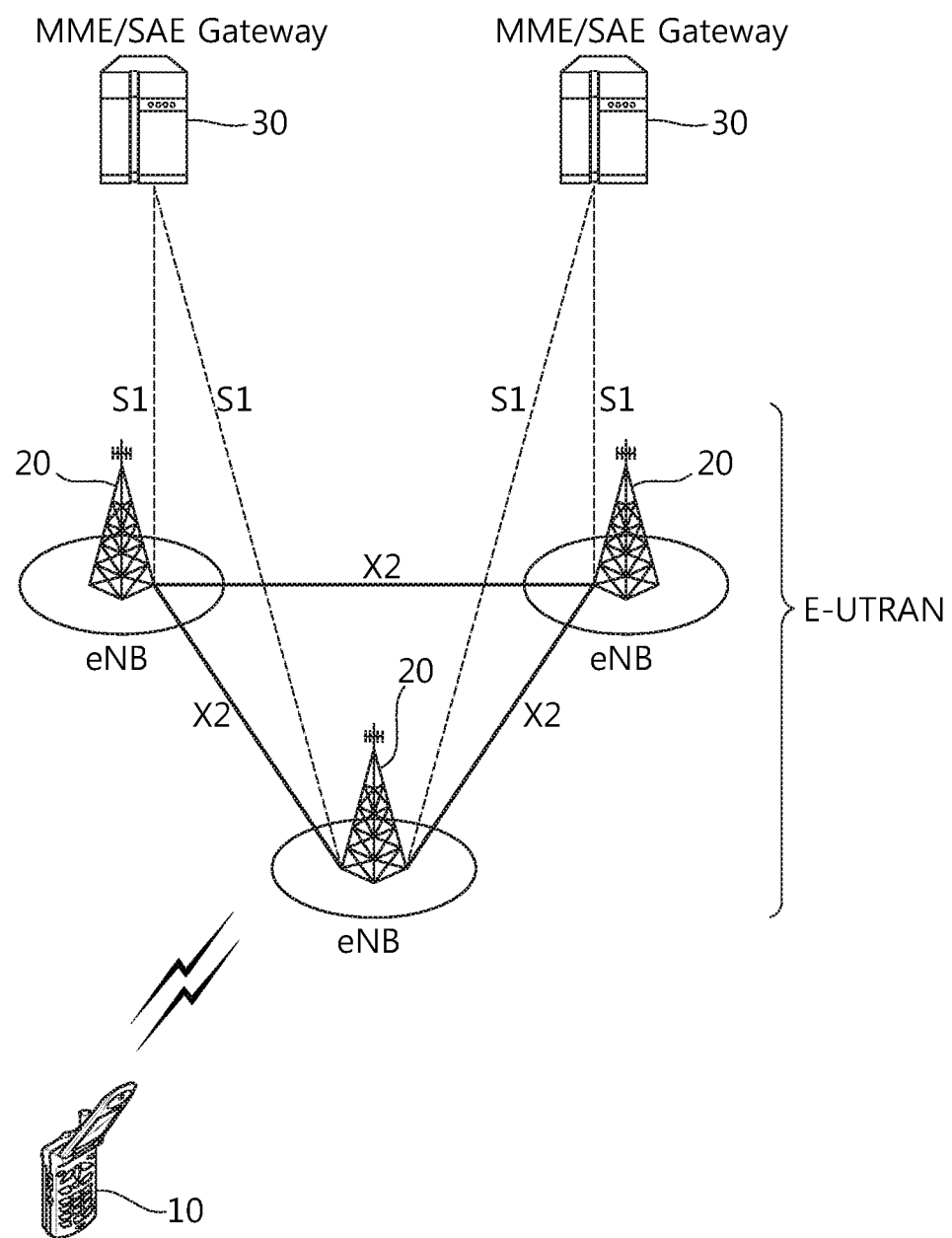
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
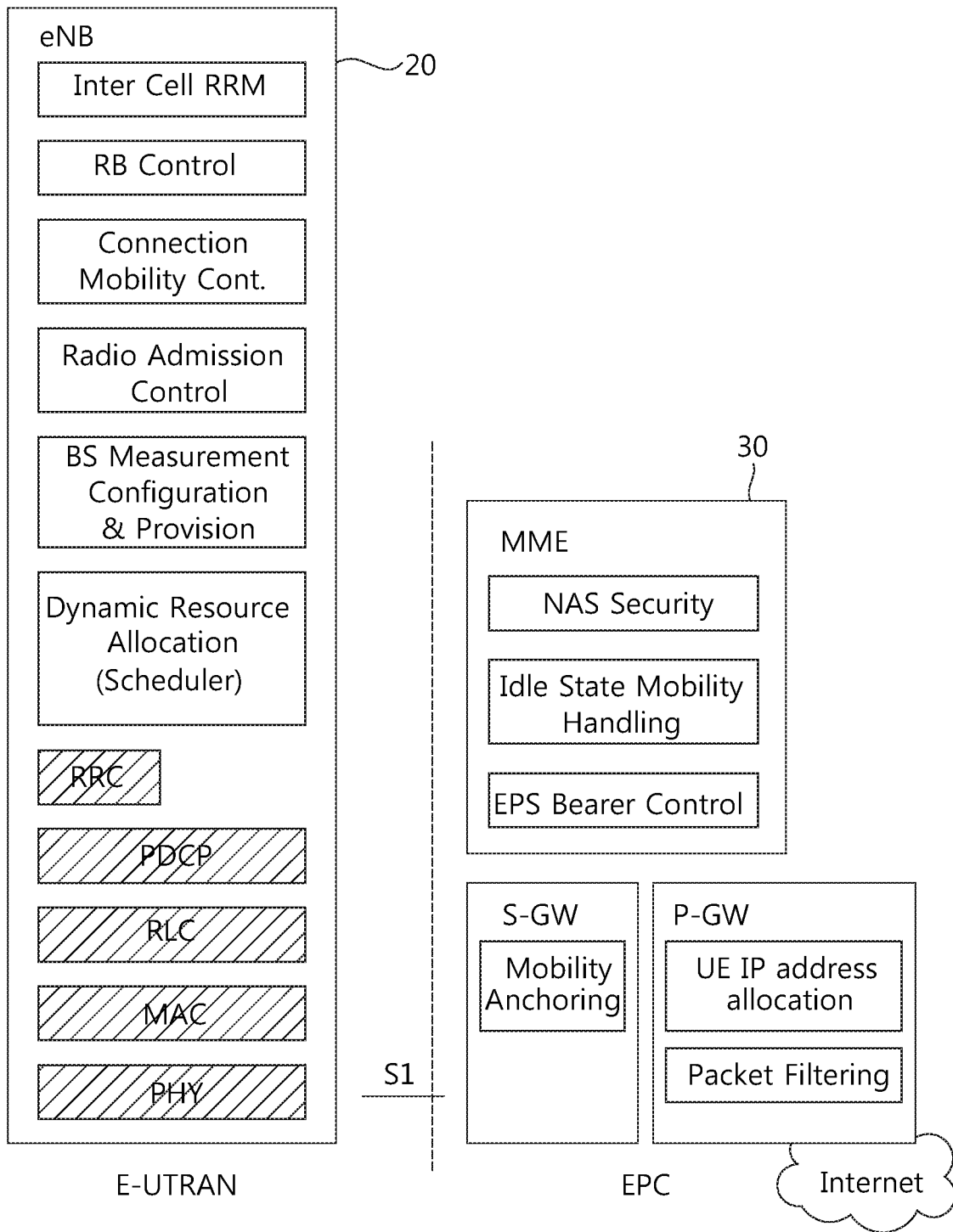
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
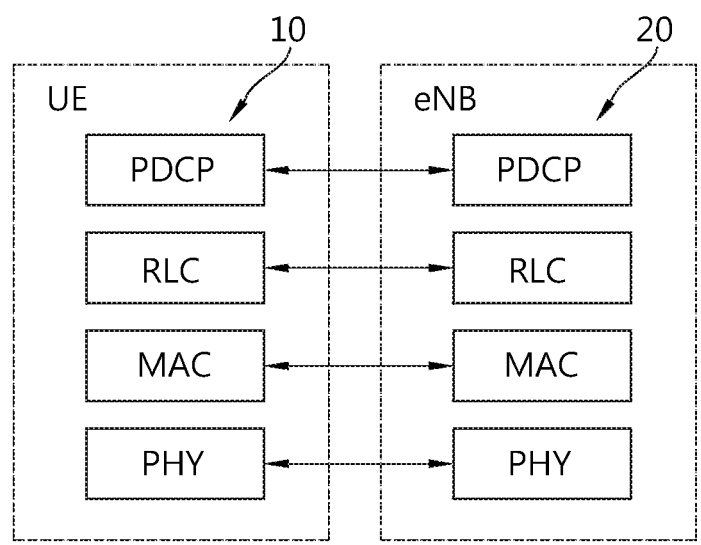
FIG. 3 shows a block diagram of a user plane protocol stack of an LTE system.
Figure 4:
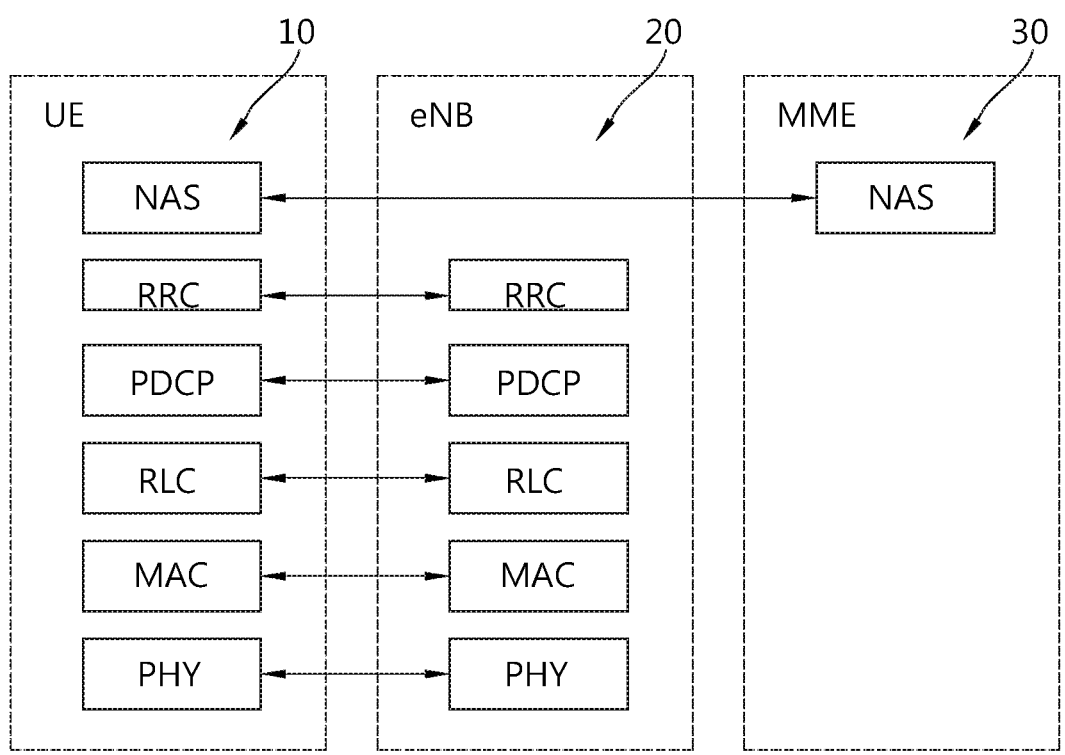
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
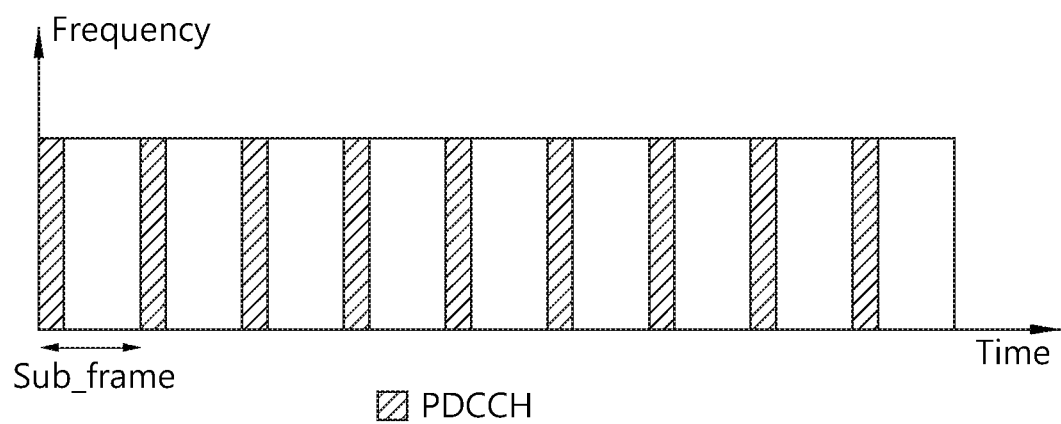
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. It may be referred to 3GPP TR 23.703 V1.0.0 (2013 December) and/or 3GPP TR 36.843 V1.0.0 (2013 November). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE. They can exist more than one ProSe application IDs per UE.

Two different modes for ProSe direct communication are supported:

1. Network independent direct communication: This mode of operation for ProSe direct communication does not require any network assistance to authorize the connection and communication is performed by using only functionality and information local to the UE(s). This mode is applicable:
    only to pre-authorized ProSe-enabled public safety UEs, regardless of whether the UEs are served by E-UTRAN or not,
    to both ProSe direct communication one-to-one and to ProSe direct communication one-to-many.

2. Network authorized direct communication: This mode of operation for ProSe direct communication always requires network assistance by the EPC to authorize the connection. This mode of operation applies:
    to ProSe direct communication one-to-one,
    when both UEs are served by E-UTRAN, and
    for public safety UEs it may apply when only one UE is served by E-UTRAN.

It has been identified that the following models for direct discovery may exist.

1. Model A ("I am here"): This model defines two roles for the UEs that are participating in direct discovery.
    Announcing UE: The UE announces certain information that may be used from UEs in proximity that have permission to discover.
    Monitoring UE: The UE that receives certain information that is interested in from other UEs in proximity.

In this model, the announcing UE broadcasts the discovery messages at pre-defined discovery intervals and the UEs that are interested in these messages read them and process them. It is equivalent to "I am here" since the announcing UE would broadcast information about itself, e.g. its ProSe application IDs or ProSe UE IDs in the discovery message.

2. Model B ("who is there"/"are you there"): This model defines two roles for the UEs that are participating in direct discovery.
    Discoverer UE: The UE transmits a request containing certain information about what is interested to discover.
    Discoveree UE: The UE that receives the request message can respond with some information related to the discoverer's request.

It is equivalent to "who is there/are you there" since the discoverer UE sends information about other UEs that would like to receive responses from, e.g. the information can be about a ProSe application ID corresponding to a group and the members of the group can respond.

Figure 6:
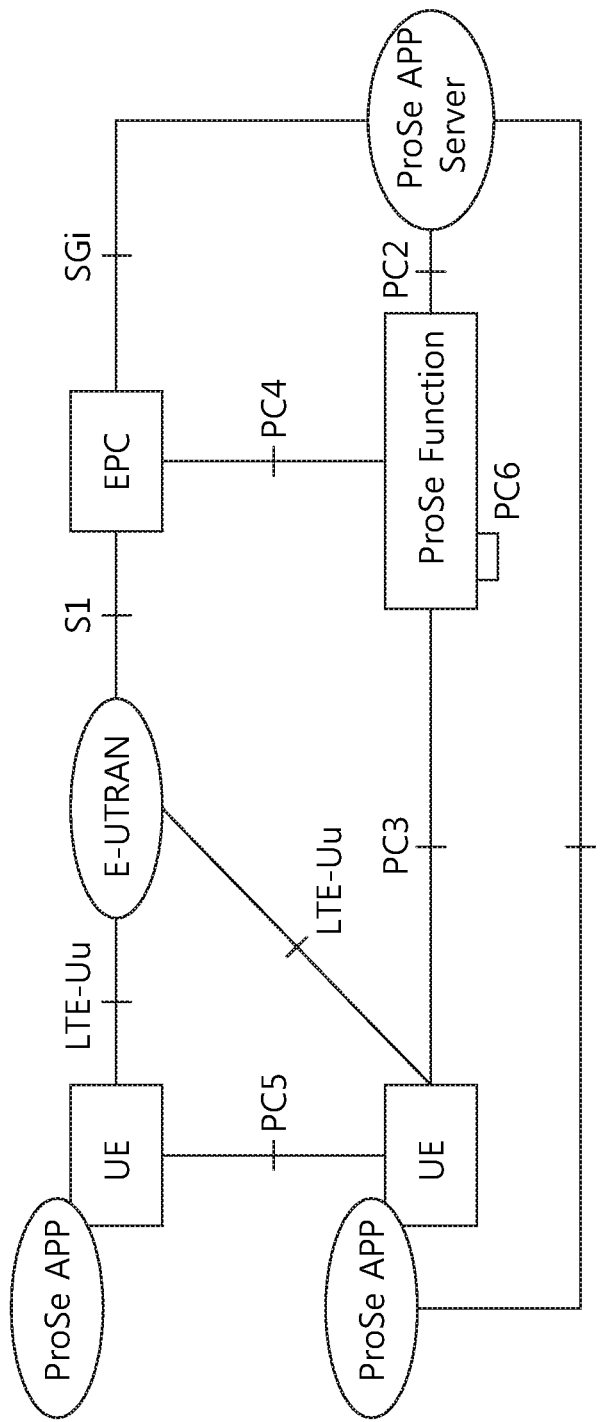
FIG. 6 shows reference architecture for ProSe.

FIG. 6 shows reference architecture for ProSe. Referring to FIG. 6, the reference architecture for ProSe includes E-UTRAN, EPC, a plurality of UEs having ProSe applications, ProSe application server, and ProSe function. The EPC represents the E-UTRAN core network architecture. The EPC includes entities such as MME, S-GW, P-GW, policy and charging rules function (PCRF), home subscriber server (HSS), etc. The ProSe application servers are users of the ProSe capability for building the application functionality. In the public safety cases, they can be specific agencies (PSAP), or in the commercial cases social media. These applications rare defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings, but not be restricted thereto.

Interworking via a reference point towards the 3rd party applications
  Authorization and configuration of the UE for discovery and direct communication
  Enable the functionality of the EPC level ProSe discovery
  ProSe related new subscriber data and handling of data storage, and also handling of ProSe identities
  Security related functionality
  Provide control towards the EPC for policy related functionality
  Provide functionality for charging (via or outside of EPC, e.g., offline charging)

Reference points/interfaces in the reference architecture for ProSe are described.

PC1: It is the reference point between the ProSe application in the UE and in the ProSe application server. It is used to define application level signaling requirements.
  PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.
  PC3: It is the reference point between the UE and ProSe function. It is used to define the interaction between UE and ProSe function. An example may be to use for configuration for ProSe discovery and communication.
  PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

Figure 7:
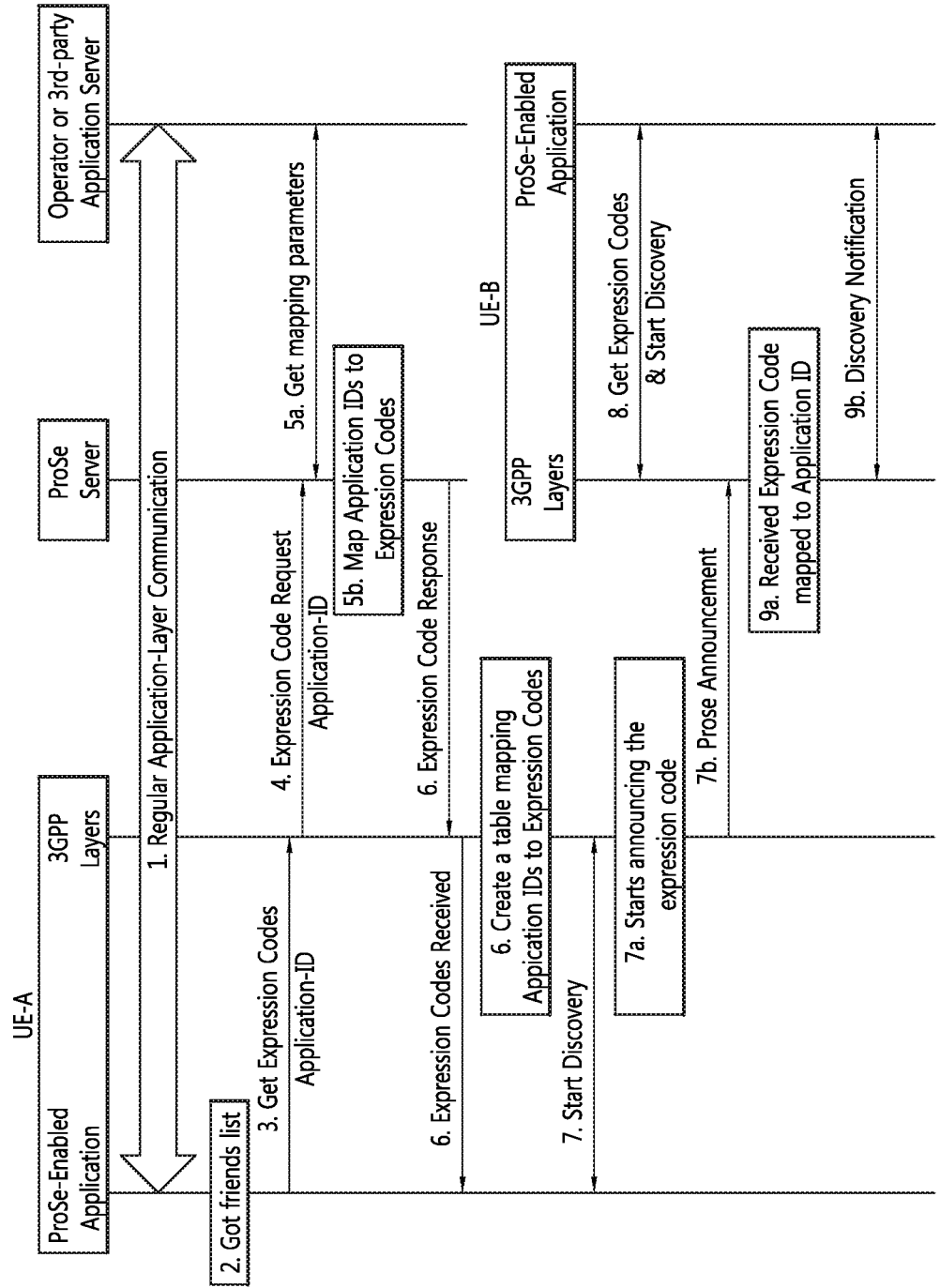
FIG. 7 shows an example of one-step ProSe direct discovery procedure.

FIG. 7 shows an example of one-step ProSe direct discovery procedure. FIG. 7 corresponds to a solution for direct discovery. This solution is based on mapping application identities to ProSe private expression codes in the network. FIG. 7 shows that two UEs are running the same ProSe-enabled application and it is assumed that the users of those UEs have a "friend" relationship on the considered application. The "3GPP Layers" shown in FIG. 7 correspond to the functionality specified by 3GPP that enables mobile applications in the UE to use ProSe discovery services.

UE-A and UE-B run a ProSe-enabled application, which discovers and connects with an associated application server in the network. As an example, this application could be a social networking application. The application server could be operated by the 3GPP network operator or by a third-party service provider. When operated by a third-party provider, a service agreement is required between the third-party provider and the 3GPP operator in order to enable communication between the ProSe Server in the 3GPP network and the application server.

1. Regular application-layer communication takes place between the mobile application in UE-A and the application server in the network.

2. The ProSe-enabled application in UE-A retrieves a list of application-layer identifiers, called "friends". Typically, such identifiers have the form of a network access identifier.

3. The ProSe-enabled application wants to be notified when one of UE-A's friends is in the vicinity of UE-A. For this purpose, it requests from the 3GPP layers to retrieve private expressions codes (i) for the user of UE-A (with an application-layer identity) and (ii) for each one of his friends.

4. The 3GPP layers delegate the request to a ProSe server in the 3GPP network. This server can be located either in home PLMN (HPLMN) or in a visited PLMN (VPLMN). Any ProSe server that supports the considered application can be used. The communication between the UE and ProSe server can take place either over the IP layer or below the IP layer. If the application or the UE is not authorized to use ProSe discovery, then the ProSe server rejects the request.

5. The ProSe server maps all provided application-layer identities to private expression codes. For example, the application-layer identity is mapped to the private expression code. This mapping is based on parameters retrieved from the application server in the network (e.g., mapping algorithm, keys, etc.) thus the derived private expression code can be globally unique. In other words, any ProSe server requested to derive the private expression of the application-layer identity for a specific application, it will derive the same private expression code. The mapping parameters retrieved from the application server describe how the mapping should be done. In this step, the ProSe server and/or the application server in the network authorize also the request to retrieve expression codes for a certain application and from a certain user. It is ensured, for example, that a user can retrieves expression codes only for his friends.

6. The derived expression codes for all requested identities are sent to the 3GPP layers, where they are stored for further use. In addition, the 3GPP layers notify the ProSe-enabled application that expression codes for the requested identities and application have been successfully retrieved. However, the retrieved expression codes are not sent to the ProSe-enabled application.

7. The ProSe-enabled application requests from the 3GPP layers to start discovery, i.e., attempt to discover when one of the provided "friends" is in the vicinity of UE-A and, thus, direct communication is feasible. As a response, UE-A announces the expression code of the application-layer identity for the considered application. The mapping of this expression code to the corresponding application-layer identify can only be performed by the friends of UE-A, who have also received the expression codes for the considered application.

8. UE-B also runs the same ProSe-enabled application and has executed steps 3-6 to retrieve the expression codes for friends. In addition, the 3GPP layers in UE-B carry out ProSe discovery after being requested by the ProSe-enabled application.

9. When UE-B receives the ProSe announcement from UE-A, it determines that the announced expression code is known and maps to a certain application and to the application-layer identity. The UE-B can determine the application and the application identity that corresponds to the received expression code because it has also received the expression code for the application-layer identity (UE-A is included in the friend list of UE-B).

The steps 1-6 in the above procedure can only be executed when the UE is inside the network coverage. However, these steps are not required frequently. They are only required when the UE wants to update or modify the friends that should be discovered with ProSe direct discovery. After receiving the requested expression codes from the network, the ProSe discovery (steps 7 and 9) can be conducted either inside or outside the network coverage.

It is noted that an expression code maps to a certain application and to a certain application identity. Thus when a user runs the same ProSe-enabled application on multiple UEs, each UE announces the same expression code.

Figure 8:
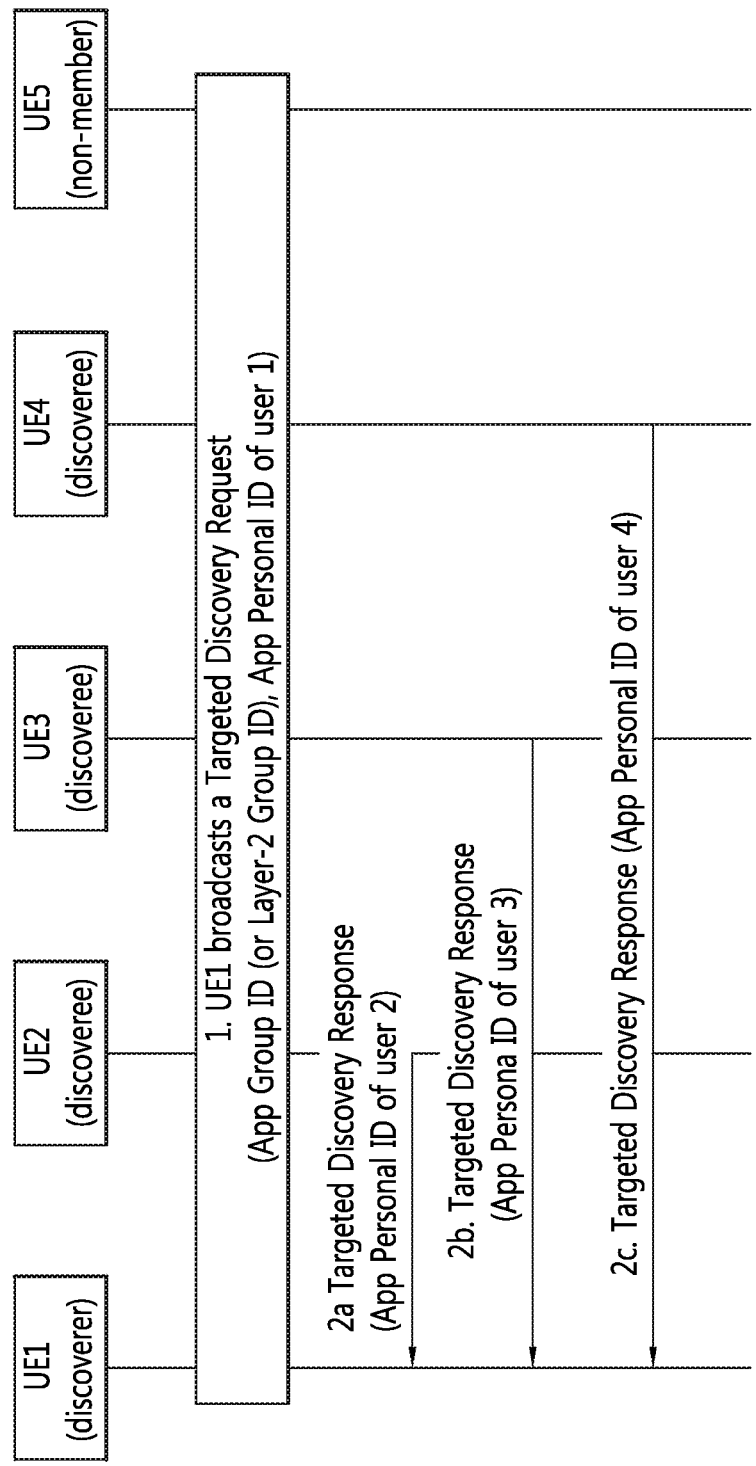
FIG. 8 shows an example of two-steps ProSe direct discovery procedure.

FIG. 8 shows an example of two-steps ProSe direct discovery procedure. FIG. 8 corresponds to a targeted ProSe discovery. The present solution is a "who is there?" type of solution where a user (the "discoverer") searches to discover a specific target population (the "discoverees").

1. The user of UE1 (the discoverer) wishes to discover whether there are any members of a specific group communication service enabler (GCSE) group in proximity. UE1 broadcasts a targeted discovery request message containing the unique App group ID (or the Layer-2 group ID) of the targeted GCSE group. The targeted discovery request message may also include the discoverer's unique identifier (App personal ID of user 1). The targeted discovery request message is received by UE2, UE3, UE4 and UE5. Apart from the user of UE5, all other users are members of the requested GCSE group and their UEs are configured accordingly.

2a-2c. Each one of UE2, UE3 and UE4 responds directly to UE1 with a targeted discovery response message which may contain the unique App personal ID of its user. In contrast, UE5 sends no response message.

In three step procedure, UE1 may respond to the targeted discovery response message by sending a discovery confirm message.

For general design assumption for D2D operation, it is assumed that D2D operates in uplink spectrum (in the case of frequency division duplex (FDD)) or uplink sub-frames of the cell giving coverage (in case of time division duplex (TDD) except when out of coverage). Use of downlink sub-frames in the case of TDD can be studied further. It is assumed that D2D transmission/reception does not use full duplex on a given carrier. From individual UE perspective, on a given carrier D2D signal reception and cellular uplink transmission do not use full duplex. For multiplexing of a D2D signal and cellular signal from an individual UE perspective on a given carrier, frequency division multiplexing (FDM) shall not be used, but time division multiplexing (TDM) can be used. This includes a mechanism for handling/avoiding collisions.

D2D discovery is described. At least the following two types of discovery procedure are defined. However, it is clear that these definitions are intended only to aid clarity for description and not to limit the scope of the present invention.

Type 1: a discovery procedure where resources for discovery signal transmission are allocated on a non UE specific basis.

Type 2: a discovery procedure where resources for discovery signal transmission are allocated on a per UE specific basis. Resources may be allocated for each specific transmission instance of discovery signals, or may be semi-persistently allocated for discovery signal transmission.

Note that further details of how the resources are allocated and by which entity, and of how resources for transmission are selected within the allocated resources, are not restricted by these definitions.

FIG. 9 to FIG. 12 shows scenarios for D2D ProSe. Referring to FIG. 9 to FIG. 12, UE1 and UE2 are located in coverage/out of coverage of a cell. When UE1 has a role of transmission, UE1 sends discovery message and UE2 receives it. UE1 and UE2 can change their transmission and reception role. The transmission from UE1 can be received by one or more UEs like UE2. Table 1 shows more detailed D2D scenarios described in FIG. 9 to FIG. 12.

TABLE 1

Figure 9:
FIG. 9 to FIG. 12 shows scenarios for D2D ProSe.
Figure 10:
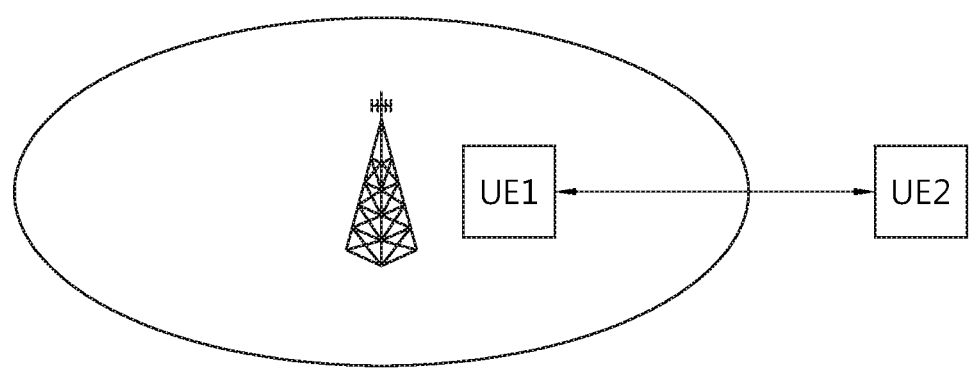
Figure 11:
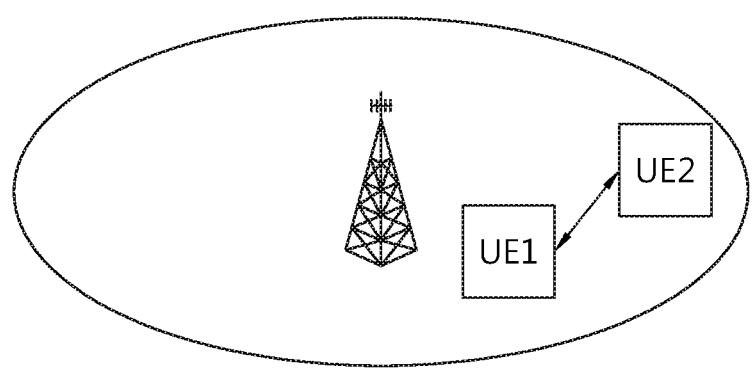
Figure 12:
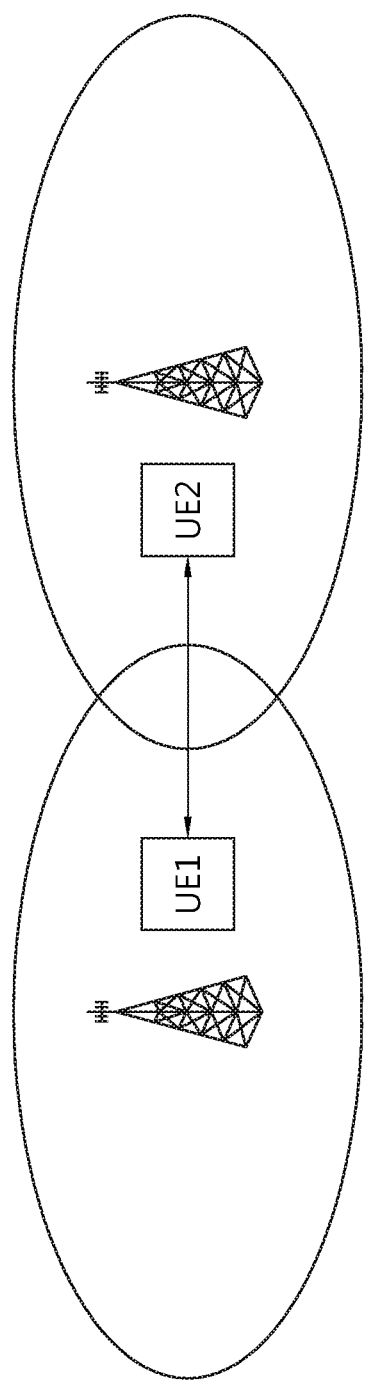

| Scenarios | UE1 | UE2 |
|---|---|---|
| FIG. 9: Out of Coverage | Out of Coverage | Out of Coverage |
| FIG. 10: Partial Coverage | In Coverage | Out of Coverage |
| FIG. 11: In Coverage-Single-Cell | In Coverage | In Coverage |
| FIG. 12: In Coverage-Multi-Cell | In Coverage | In Coverage |

Referring to Table 1, the scenario shown in FIG. 9 corresponds to a case that both UE1 and UE2 are out of coverage. The scenario shown in FIG. 10 corresponds to a case that UE1 is in coverage, but UE2 is out of coverage. The scenario shown in both FIG. 11 and FIG. 12 corresponds to a case that both UE1 and UE2 are in coverage. But, the scenario shown in FIG. 11 corresponds to a case that UE1 and UE2 are both in coverage of a single cell, while the scenario shown in FIG. 12 corresponds to a case that UE1 and UE2 are in coverage of multi-cells, respectively, which are neighboring each other.

D2D communication is described. D2D discovery is not a required step for groupcast and broadcast communication. For groupcast and broadcast, it is not assumed that all receiving UEs in the group are in proximity of each other. When UE1 has a role of transmission, UE1 sends data and UE2 receives it. UE1 and UE2 can change their transmission and reception role. The transmission from UE1 can be received by one or more UEs like UE2.

While the UE is in RRC_CONNECTED, if the UE is allowed to transmit a D2D message only on a serving frequency, the UE needs to camp on a cell of a frequency in which a D2D resource is allocated. However, if the UE is served by a cell of frequency in which the D2D resource is not allocated, the UE cannot perform D2D operation (e.g., D2D transmission). Alternatively, while the UE is in RRC_CONNECTED, if the UE is allowed to transmit a D2D message only on a frequency (frequency 1) while camping on a certain frequency (frequency 2), the UE needs to camp on a cell of frequency 1. However, if the UE is served by a cell of other frequency (e.g., frequency 3), the UE cannot perform D2D operation (e.g., D2D transmission) due to UE capability limitation, etc. Therefore, UE's interest of D2D operation needs to be known to the network.

In order to solve the problem described above, a method for transmitting information for D2D operation according to an embodiment of the present invention is described. According to an embodiment of the present invention, the UE transmits various pieces of information on D2D operation to the network, and the network uses the received information on D2D operation in various manners.

Figure 13:
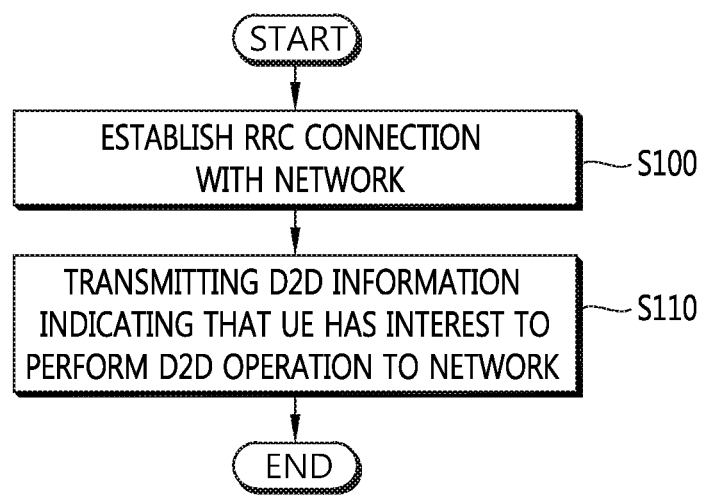
FIG. 13 shows an example of a method for transmitting information for D2D operation according to an embodiment of the present invention.

FIG. 13 shows an example of a method for transmitting information for D2D operation according to an embodiment of the present invention. Referring to FIG. 13, in step S100, the UE establishes a RRC connection with the network. If the UE has interest to perform D2D operation, in step S110, the UE transmits information for D2D operation (hereinafter, D2D information) to the network. The D2D information may indicate that the UE has interest to perform D2D operation to the network. D2D operation may refer to D2D transmission and/or D2D reception. Step S110 may be combined with step S100 such that the UE transmits the D2D information during the RRC connection establishment procedure, e.g. in the RRC connection setup complete message.

The D2D information may indicate at least one piece of information on D2D operation described below.

The D2D information may indicate at least one frequency on which the UE wants to perform D2D operation. As one example, the D2D information may indicate a list of preferred serving frequencies. This information indicates that while camping on the preferred serving frequencies, the UE can perform D2D operation. This information may be common information to indicate the possible D2D operation on the preferred frequencies. This information may be separate information to indicate where the possible D2D operation is D2D reception or D2D communication respectively on the preferred frequencies. As another example, the D2D information may indicate a list of preferred frequencies on which the UE wants to perform D2D operation. As another example, the D2D information may indicate a list of following information, i.e. {serving frequency (frequency 1), list of frequencies on which D2D operation is possible while the UE is served by the indicated serving frequency}.

The D2D information may indicate at least one PLMN on which UE wants to perform D2D operation. This information may be signaled semi-statically.

The D2D information may indicate whether the UE wants to perform either D2D transmission or D2D reception.

The D2D information may indicate whether the UE wants to perform either D2D communication or D2D discovery.

The D2D information may indicate whether the UE prefers to prioritize D2D operation over unicast operation or vice versa. This information may be signaled semi-statically. Here, the unicast operation means one-to-one communication between the UE and network using legacy 3GPP LTE technology. It is possible that D2D operation and unicast operation cannot be performed simultaneously according to UE's TX/RX capability. Upon receiving information indicating which operation the UE prefers between D2D operation and unicast operation, the network can control UE's operation to make occurrence of the preferred operation when D2D operation and unicast operation collide with each other, or to avoid the collision.

The D2D information may indicate requested D2D service(s) which the UE is interested to have via D2D operation. For example, the requested D2D service may be voice call (or streaming), video call (or streaming), emergency call, file exchange, web browsing or text messaging. For another example, the requested D2D service may be public safety communication, commercial direct communication, vehicular communication which may further include, e.g. vehicle-to-vehicle (V2V), vehicle-to-pedestrians (V2P), vehicle-to-infrastructure (V21).

The D2D information may indicate priorities among different D2D services which the UE may need to have or the UE currently has. This information may be signaled semi-statically or dynamically. This information indicates the preferred priorities among different services enabled or performed by D2D operation. For example, this information may indicate priorities among voice call (or streaming), video call (or streaming), emergency call, file exchange, web browsing or text messaging based on its preference. For another example, this information may indicate priorities among public safety communication, commercial direct communication or vehicular communication based on its preference.

The D2D information may indicate expected or required range of D2D operation. This information may be signaled semi-statically or dynamically. The expected or required range of D2D operation may be different from each other per D2D service, and accordingly, the UE may indicate the expected or required range per D2D service. The expected or required range of D2D operation may be different from each other per each D2D discovery message, and accordingly, the UE may indicate the expected or required range per each D2D discovery message. The expected or required range of D2D operation may be indicated by preferred maximum TX power for D2D transmission. Alternatively, the expected or required range of D2D operation may be indicated by preferred range class configured to the UE for D2D transmission. The range class may be classified, e.g. short, medium, long range. Alternatively, the expected or required range of D2D operation may be indicated by preferred distance range. The distance range may be indicated by an explicit distance in a unit of, e.g. meters or kilometers. The range class or distance range may be configured by the network. The UE may select the range to indicate range class such that the indicated range is most close to the required range while the indicated range exceeds the required range, if possible. The network may use the received information to determine the maximum transmit power for D2D transmission of the UE, to determine the proper power control parameters, or to determine the proper power control mechanism between open loop power control (estimated path-loss based UE-controlled power control) or closed loop power control (transmit power control command based network-controlled power control).

The D2D information may indicate acceptable latency level for D2D operation. This information may be signaled semi-statically. The acceptable latency level for D2D operation may be different from each other per D2D service. The acceptable latency indicates how much the UE or the service for the UE via D2D operation can tolerate the latency that may be incurred while in D2D operation (e.g., resource allocation latency—the time until the UE is actually allocated the resource to perform D2D operation since the UE becomes interest to perform D2D operation). Different latency class may indicate different level of latency. The UE may indicate whether the concerned D2D service is delay-tolerant or delay-sensitive. The network may use the received information to determine the RRC state of the UE, given that the potential latency or service interruption for the D2D operation may be different in each RRC state. The network may use the received information to determine proper scheduling scheme or resource allocation scheme (between network-scheduling scheme and UE autonomous selection scheme), given that the different scheduling scheme or resource allocation scheme for the D2D operation may introduce different latency level.

The D2D information may indicate the observed/estimated load of D2D operation in the network. This information may be signaled semi-statically or event-based triggering. The observed/estimated load of D2D operation may be different from each other per D2D service. The observed/estimated load of D2D operation may be indicated by average number of received D2D messages per certain time duration or per period. Per frequency load may be indicated. In this case, the UE may indicate the frequency on which the UE observes the load of D2D operation. Once the D2D information including the observed/estimated load of D2D operation is reported, subsequent reporting may be performed based on periodic reporting, or delta change based triggering where the subsequent reporting is triggered if change of load is larger than the delta amount. The network may use the received information to determine whether the required service should be performed via D2D operation or via UE-network operation. For example, if there is high D2D operation, the network may configure the UE to operate in UE-network operation for the concerned or requested service.

The D2D information may indicate its preferred communication group(s).

The D2D information may indicate combination of at least one piece of information described above.

The UE may transmit the D2D information indicating at least one piece of information on D2D operation described above to the network at a specific time point or under a specific condition.

When the UE transits from RRC_IDLE to RRC_CONNECTED, the UE may transmit the D2D information if the UE has interest to perform D2D operation. After transmitting the D2D information to the network, if at least one piece of information on D2D operation is changed, the UE may transmit the updated D2D information to the network. Alternatively, the UE may indicate the network that at least one piece of information on D2D operation is changed or what type of information is changed, and the network may request the updated D2D information from the UE. Thereafter, the UE may transmit the updated D2D information to the network.

The UE may transmit the D2D information via control information which requests/triggers D2D scheduling to the network. If the UE is configured to perform D2D operation (e.g. D2D transmission) by D2D scheduling of the network, i.e. using resources indicated by the network, the UE may transmit the D2D information, which corresponds to data to be transmitted, via control information which requests/triggers D2D scheduling (e.g. buffer status report (BSR)) to the network.

The UE may indicate the D2D information to the network by using RRC messages, i.e. the D2D information may be included in RRC messages transmitted by the UE. Alternatively, the UE may indicate the D2D information to the network by using L2 signaling other than RRC messages, e.g. MAC control element (CE) or scheduling request (SR) or buffer status report (BSR), or by using L1 signaling.

The UE may indicate the D2D information to the network without explicit request by the network, in order to enable D2D operation or to update the D2D information if previously indicated. The UE may indicate the D2D information to the network upon request by the network. The network may further indicate which D2D information is requested. The network may request the UE to indicate the D2D information periodically on, e.g. observed/estimated load of D2D operation.

Upon receiving the D2D information, the network may allow a D2D gap during which the UE is allowed to leave the current frequency to perform D2D operation (D2D transmission or D2D reception). The gap may occur periodically by a configuration of periodicity of gap and each gap period. Or, the gap may occur once by a configuration of gap period and start time of the gap.

Further, upon receiving the D2D information, the network may trigger the handover procedure to handover the UE to a cell of frequency in which D2D resource is allocated. Upon handover, the UE may need to re-transmit the D2D information to a target cell after handover completion.

If the UE revokes its interest to perform D2D operation, the UE may transmit D2D information indicating that the UE has no longer interest to perform D2D operation to the network. No frequency in the D2D information may indicate no interest of D2D operation.

The network may control whether the UE is allowed to transmit the D2D information by signaling, e.g. one bit flag in system information block (SIB) broadcast message or dedicated signaling (e.g. RRC connection reconfiguration message).

The D2D information indicating further information on D2D operation described above may be only applicable for D2D discovery. In this case, the UE is not allowed to transmit the D2D information for D2D communication. Alternatively, the D2D information indicating further information on D2D operation described above may be only applicable for D2D communication. In this case, the UE is not allowed to transmit the D2D information for D2D discovery. Or, it is possible that such implicit highest priority for the concerned frequency for D2D operation may be applicable for any of D2D communication or D2D discovery.

Figure 14:
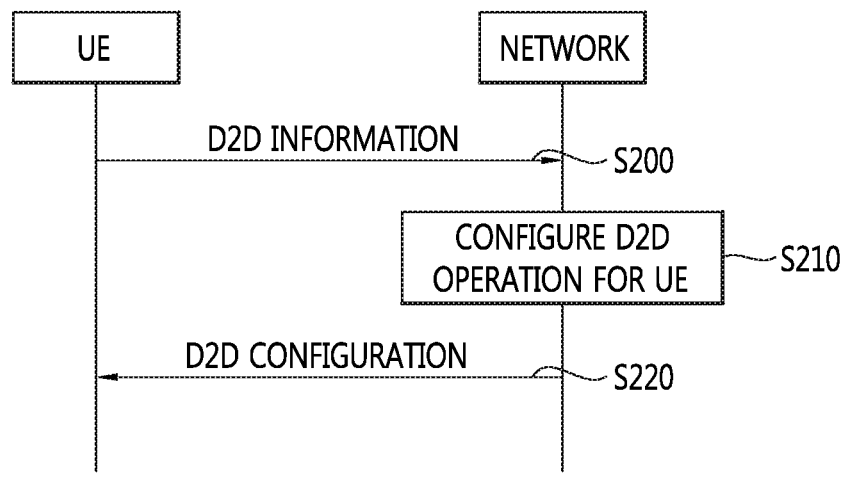
FIG. 14 shows another example of a method for transmitting information for D2D operation according to an embodiment of the present invention.

FIG. 14 shows another example of a method for transmitting information for D2D operation according to an embodiment of the present invention. Referring to FIG. 14, in step S200, the UE transmits D2D information described above to the network. In step S210, upon receiving the D2D information from the UE, the network configures D2D operation for the UE based on the received D2D information. In step S220, the network transmits the D2D configuration to the UE, and upon receiving the D2D configuration, the UE may perform the corresponding D2D operation. For example, the UE transmits D2D information indicating that the UE prefers V2V communication and current load level (assumed to be normal) for D2D operation to the network. Upon receiving the D2D information from the UE, the network configures V2V communication via D2D operation, and notifies D2D configuration for V2V communication to the UE. The UE can V2V communication via D2D operation. Since then, the UE detects that load level for D2D operation increases (from normal to high), and transmits updated D2D information to the network. Upon receiving the updated D2D information from the UE, the network configures V2V communication via UE-NW operation, and notifies this to the UE.

Figure 15:
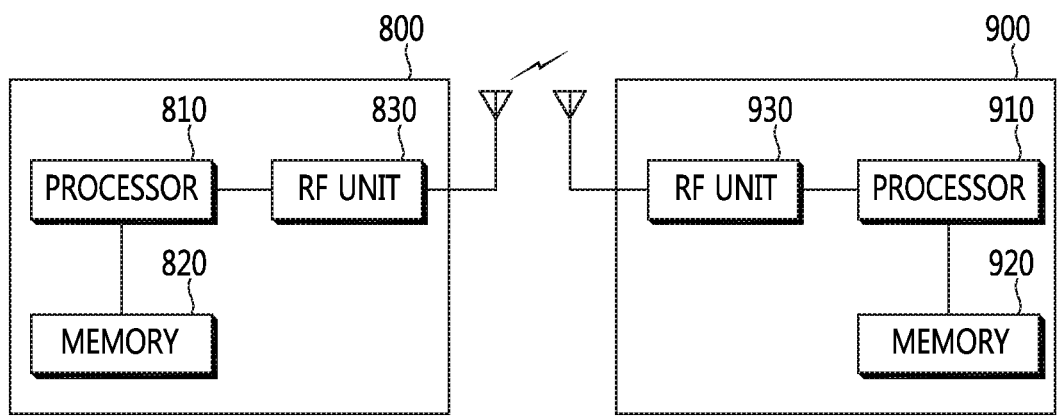
FIG. 15 shows a wireless communication system to implement an embodiment of the present invention.

FIG. 15 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for operating a base station (BS) in a wireless communication system, the method comprising:
    receiving, from a wireless device, a message including:
        first information informing at least one frequency on which the wireless device wants to transmit a device-to-device (D2D) discovery signal to another wireless device, and
        second information informing that the wireless device wants to receive the D2D discovery signal from another wireless device; and
    transmitting, to the wireless device, information on a gap in which the wireless device transmits the D2D discovery signal to another wireless device or receives the D2D discovery signal from another wireless device.

2. The method of claim 1, wherein the information on the gap includes a periodicity of the gap.

3. The method of claim 1, wherein the information on the gap includes a start timing of the gap.

4. The method of claim 1, wherein the message includes information which informs at least one public land mobile network (PLMN) on which the wireless device wants to transmit or receive the D2D discovery signal.

5. The method of claim 1, wherein the message includes information which informs a preference of the wireless device between transmission or reception of the D2D discovery signal and a unicast operation.

6. The method of claim 1, wherein the message includes information which informs a required range of transmission or reception of the D2D discovery signal.

7. The method of claim 6, wherein the required range of the transmission and/or reception of the D2D discovery signal is informed by at least one of:
    a preferred maximum transmission power for the transmission, reception of the D2D discovery signal,
    a preferred range class for the transmission, reception of the D2D discovery signal,
    a preferred distance range for the transmission, or reception of the D2D discovery signal.

8. The method of claim 1, wherein the message includes information which informs a level of acceptable latency of the transmission or reception of the D2D discovery signal.

9. A base station (BS) in a wireless communication system, the BS comprising:
    a memory;
    a transceiver; and
    a processor, operably coupled to the memory and the transceiver, wherein the BS is configured to:
        receive, from a wireless device, a message including:
            first information informing at least one frequency on which the wireless device wants to transmit a device-to-device (D2D) discovery signal to another wireless device, and
            second information informing that the wireless device wants to receive the D2D discovery signal from another wireless device; and
        transmit, to the wireless device, information on a gap in which the wireless device transmits the D2D discovery signal to another wireless device or receives the D2D discovery signal from another wireless device.

10. The BS of claim 9, wherein the information on the gap includes a periodicity of the gap.

11. The BS of claim 9, wherein the information on the gap includes a start timing of the gap.

12. The BS of claim 9, wherein the message includes information which informs at least one public land mobile network (PLMN) on which the wireless device wants to transmit or receive the D2D discovery signal.

13. The BS of claim 9, wherein the message includes information which informs a preference of the wireless device between transmission or reception of the D2D discovery signal and a unicast operation.

14. The BS of claim 9, wherein the message includes information which informs a required range of transmission or reception of the D2D discovery signal.

15. The BS of claim 14, wherein the required range of the transmission and/or reception of the D2D discovery signal is informed by at least one of:
    a preferred maximum transmission power for the transmission,
    reception of the D2D discovery signal,
    a preferred range class for the transmission,
    reception of the D2D discovery signal,
    a preferred distance range for the transmission, or
    reception of the D2D discovery signal.

16. The BS of claim 9, wherein the message includes information which informs a level of acceptable latency of the transmission or reception of the D2D discovery signal.

* * * * *